United States Patent
Michel et al.

(10) Patent No.: US 8,162,332 B2
(45) Date of Patent: Apr. 24, 2012

(54) DEVICE FOR ADJUSTING THE CAMBER AND/OR THE TOE OF WHEELS OF WHEEL SUSPENSIONS

(75) Inventors: Wilfried Michel, Riedenburg (DE);
Karl-Heinz Meitinger, Munich (DE);
Christoph Kossira, Ingolstadt (DE);
Hugo Mueller, Rohrenfels-Ballersdorf (DE); Wolfgang Schmid, Freising (DE)

(73) Assignee: Audi AG, Ingolstadt (DE)

( * ) Notice: Subject to any disclaimer, the term of this patent is extended or adjusted under 35 U.S.C. 154(b) by 5 days.

(21) Appl. No.: 12/695,577

(22) Filed: Jan. 28, 2010

(65) Prior Publication Data
US 2010/0253026 A1     Oct. 7, 2010

(30) Foreign Application Priority Data
Jan. 30, 2009   (DE) .......................... 10 2009 006 903

(51) Int. Cl.
*B60G 7/02* (2006.01)
(52) U.S. Cl. .............................. 280/86.751; 280/876.78
(58) Field of Classification Search .............. 280/86.75, 280/86.751, 86.758
See application file for complete search history.

(56) References Cited

U.S. PATENT DOCUMENTS

| | | | |
|---|---|---|---|
| 4,973,075 A | * | 11/1990 | Rori et al. ................ 280/86.757 |
| 6,039,335 A | * | 3/2000 | Sheridan ................ 280/124.103 |
| 6,776,426 B2 | * | 8/2004 | Deal .......................... 280/86.751 |
| 7,416,264 B2 | * | 8/2008 | Tsukasaki ..................... 303/189 |
| 7,699,326 B2 | * | 4/2010 | Yamada ...................... 280/86.75 |
| 7,914,020 B2 | * | 3/2011 | Boston ..................... 280/86.751 |

FOREIGN PATENT DOCUMENTS

| | | |
|---|---|---|
| DE | 46782 | 12/1962 |
| WO | 8908566 A1 | 9/1989 |
| WO | 9816418 A1 | 4/1998 |
| WO | 2005047030 A1 | 5/2005 |

\* cited by examiner

*Primary Examiner* — Toan To
(74) *Attorney, Agent, or Firm* — Novak Druce + Quigg LLP

(57) ABSTRACT

The invention relates to a device for adjusting the camber and/or toe of a driven wheel of a wheel suspension, in particular for motor vehicles, with a wheel carrier on which the wheel is pivoted, the wheel carrier being divided into a carrier part which holds the wheel a guide part which is connected to the wheel suspension and into two pivotal parts which are arranged in between, which can be rotated to one another as well as to the carrier part and to the guide part around axes of rotation, and which interact with control surfaces which face one another and which are inclined by a defined angle to the axis of rotation, and a wheel drive shaft which is guided by the carrier part and guide part and by the pivotal parts. According to the invention, the carrier part has a hub section which surrounds the wheel drive shaft and which extends to the guide part, and around which the two pivoted part are situated, and that between the hub section and the guide part an inner sealing element is connected which seals an annular gap between the hub section and the guide part.

20 Claims, 3 Drawing Sheets

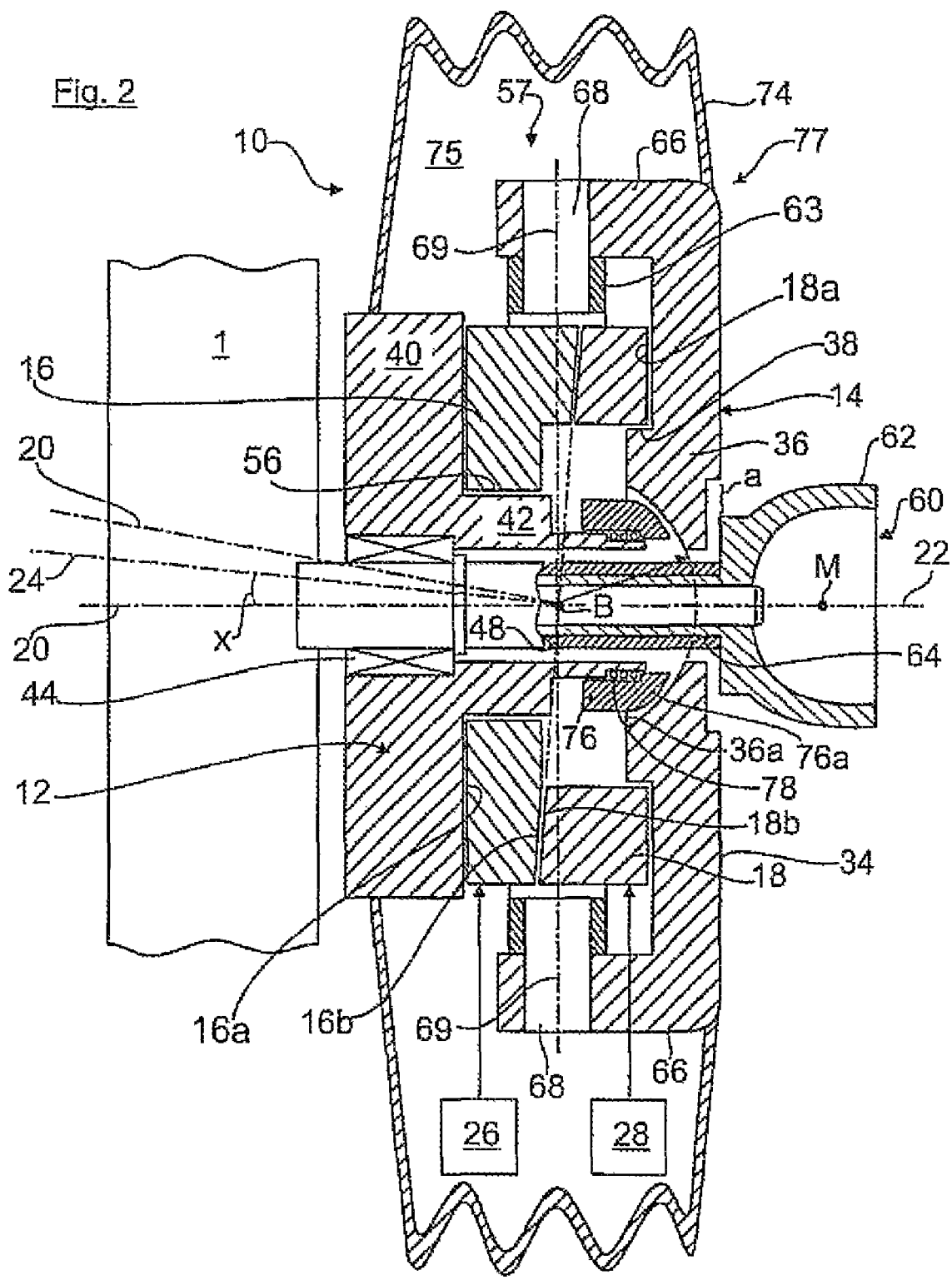

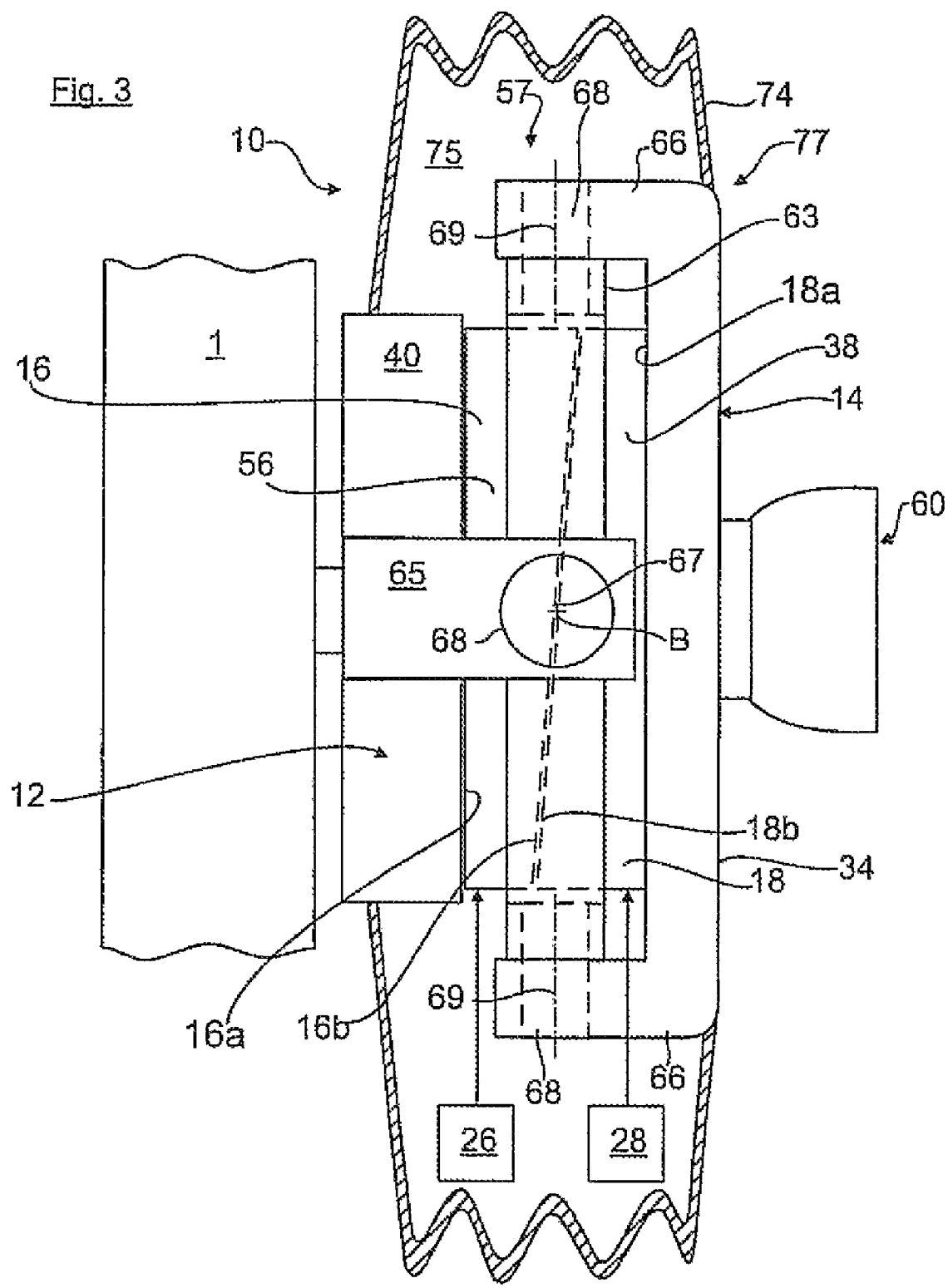

DEVICE FOR ADJUSTING THE CAMBER AND/OR THE TOE OF WHEELS OF WHEEL SUSPENSIONS

The invention relates to a device for adjusting the camber and/or toe of wheels of wheel suspensions, in particular for motor vehicles.

BACKGROUND OF THE INVENTION

In a generic device the camber and/or the toe of the wheels in driving can be adjusted by way of positioning cylinders or pivoted parts that are integrated into the wheel carrier. The wheel carrier here is divided into a carrier part which holds the wheel and a guide part which is coupled to the wheel suspension elements which pivot relative to the guide part by rotating of one or both positioning cylinders by way of electrical servomotors. Adjustment is effected by the rotationally symmetrical positioning cylinders having a common axis of rotation and oblique surfaces which are slanted thereto and which enable corresponding pivoting of the carrier part by up to 5° toe angle and/or camber angle when the positioning cylinders are rotated in the same direction or opposite direction.

The object of the invention is to develop a device of the generic type such that it is made to be especially durable with respect to functionality and structurally very compact.

SUMMARY OF THE INVENTION

It is proposed, according to the invention, that the carrier part has a flange section which holds the wheel bearing and a hub section which extends to the guide part and around which the two positioning cylinders or pivoted parts are arranged with their sliding bearing arrangements, and that between the hub section and the guide part and/or radially outside there is sealing between the flange section and the guide part. Thus it is possible to devise a construction which is structurally especially compact between the carrier part and the guide part and which satisfies even harsh conditions of use by an "encapsulated" arrangement. There is favorable force and torque support between the carrier part which is exposed to lateral forces and braking moments and the guide part.

The radially outer sealing can preferably be formed by a bellows which is permanently connected to the flange section of the carrier part and an annular projection on the guide part and which covers the positioning cylinders which are positioned within the bellows with their bearing arrangements using structurally simple means.

Especially advantageously, the bellows can be made as a metal bellows and, moreover, can be used as an anti-rotation device for the carrier part. The metal bellows can thus perform two functions in one in a manner favorable to production engineering.

In one alternative configuration, however, within a rubberelastic bellows there can be a cardan ring which is positively coupled to the carrier part and the guide part in the peripheral direction. The cardan ring in the peripheral direction can be positively provided, for example, with drivers which are oriented axially to one another, which are molded on the carrier part and the guide part, and which project into the corresponding, peripherally offset recesses of the cardan ring.

Furthermore, on the guide part a bearing ring can be formed on which a positioning cylinder is pivoted, the radially inner sealing being located between the bearing ring and the hub section of the carrier part and thus the radially inner sealing of the entire adjustment equivalent with positioning cylinders, antifriction bearings, etc., is achieved in a structurally simple manner.

The sealing can be especially advantageously formed by means of a gasket having a spherical section, which is located on the hub section, and which interacts with a dome-shaped recess in the hub section to form a seal. This results in reliable sealing of even larger adjustment deflections of the hub section relative to the bearing ring.

In particular, the gasket can be guided to be axially displaceable on the hub section and can be pretensioned by means of a spring against the dome-shaped recess in the bearing ring. Furthermore, the midpoint of the spherical section of the gasket can at least more or less coincide with the pivot pole of the carrier part when the camber and/or toe angle is adjusted by way of the positioning cylinders. Both measures enable reliable sealing even for larger adjustment angles of the carrier part in a construction which is simple in terms of production engineering. The sliding surfaces of the gasket and/or of the recess in the bearing ring should be precisionmachined and/or coated (for example with PTFE).

Furthermore, in one preferred arrangement, the positioning cylinders can be twisted by way of electrical servomotors which are attached to the flange section of the carrier part and to one flange of the guide part respectively and which interact via spur gearing with ring gears formed on the positioning cylinders, the tooth engagements each lying within the radially outer sealing.

The positioning cylinder which interacts with the carrier part can advantageously project with its ring gear into am annular groove of the flange section of the carrier part, the servomotor then being drivingly connected through a corresponding recess in the flange section to the ring gear.

For the wheel of the motor vehicle which is driven by way of an articulated shaft it is proposed that the wheel flange which carries the wheel has a hub section which extends through the hub section of the carrier part and which in the region of the radially inner sealing is drivingly connected to the articulated bell-shaped housing of the articulated shaft by way of a spline. In a durable construction and with delivery of the driving torque into the wheel flange this ensures sufficient floating of the articulated bell-shaped housing of the articulated shaft in the corresponding toe and camber adjustment of the wheel.

Finally the driving journal of the articulated bell-shaped housing, which journal has a spline, can be held by means of a clamp bolt which acts on the wheel flange with the interposition of a spacer sleeve which is supported on the articulated bell-shaped housing and on the inner wheel bearing ring and which is provided between the hub section of the wheel flange and the hub section of the carrier part.

BRIEF DESCRIPTION OF THE DRAWINGS

FIG. 2 shown in a greatly simplified front view one version of the wheel carrier in a longitudinal section; and FIG. 3 shows the wheel carrier shown in FIG. 2 in a side view and with a bellows shown in a sectional representation.

DETAILED DESCRIPTION OF THE PREFERRED EMBODIMENTS OF THE INVENTION

Figure 1:
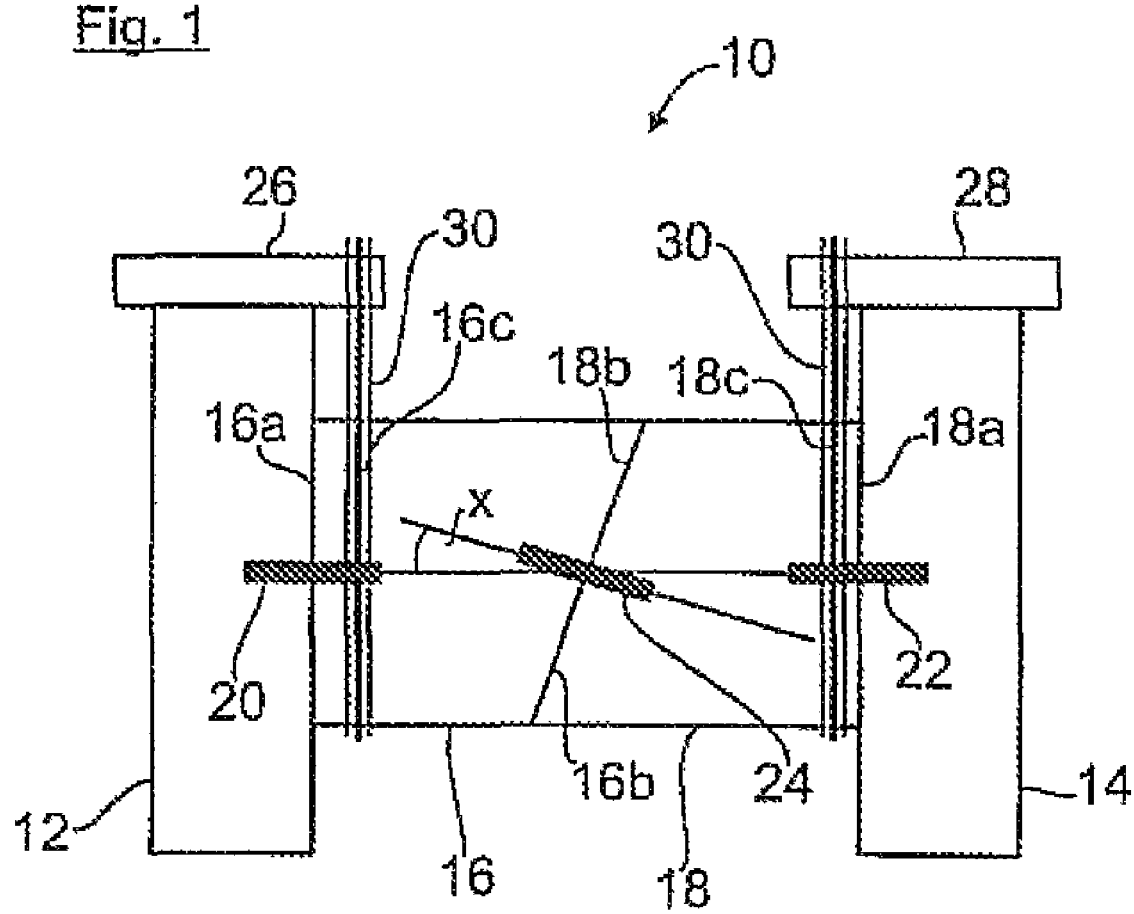
FIG. 1 shows a schematic of the device for adjusting the toe and camber angle of a wheel suspension for motor vehicles with a multipart wheel carrier.

For a theoretical explanation of the invention, FIG. 1 shows as a rough schematic a wheel guide element or wheel carrier 10 of a wheel suspension for motor vehicles which is subdivided as follows for adjusting the camber and/or toe of the wheel 1 in the region of the wheel bearing arrangement:

The wheel carrier 10 has a carrier part 12 in which the wheel of the motor vehicle is pivoted. The operating brake of the motor vehicle is rigidly connected to the carrier part 12. Let it be noted that to the extent not described the functional parts of the wheel suspension can be of prior art design.

Furthermore, the wheel carrier 10 has a guide part 14 which interacts with the wheel suspension and optionally forms part of the wheel suspension.

Between the carrier part 12 and the guide part 14, the positioning elements are two essentially rotationally symmetrical positioning cylinders or pivoted parts 16, 18 which are each connected to the carrier part 12 and the guide part 14 with a capacity to rotate by way of axes 20, 22 of rotation. The two axes 20, 22 of rotation are aligned coaxially in the figures and run in the axis of rotation of the wheel.

While the check surfaces 16a, 18a of the positioning cylinders 16, 18 directly adjacent to the carrier part 12 and the guide part 14 are made rotationally symmetrical, the positioning cylinders 16, 18 adjoin one another in sliding contact by way of flat slanted surfaces 16b, 18b such that the positioning cylinder 16 turns around an axis of rotation 24 which it inclined upward in FIGS. 1 and 2. As is apparent, the axis 24 of rotation is therefore aligned perpendicular to the slanted surfaces 16b, 18b and inclined at a defined angle x to the axis 22 of rotation.

In FIG. 1 the center axis 20 of the carrier part 12 is aligned coaxially to the axis 22 of rotation of the guide part 14. The center axis 20 of the carrier part 12 coincides with the axis of rotation of the wheel so that the vehicle wheel 1 shown in FIGS. 2 and 3 is set in a neutral position without a camber and toe angle. In the embodiment of FIG. 2, which is described later, the center axis 20' is also suggested in addition. The illustrated angular position of the center axis 20' arises when the positioning cylinder 16 is twisted relative to the positioning cylinder 18 by an angle of rotation of 180°.

On the carrier part 12 and the guide part 14 as shown in FIG. 1, there is one electrical servomotor 26, 28 each, said servomotors being propulsively connected to the positioning cylinders 16, 18 via toothed belts 30. By means of the servomotors 26, 28, the positioning cylinders 16, 18 can be twisted in the same direction or opposite direction in both directions of rotation, as a result of which the carrier part executing a wobbling motion changes the camber angle and/or toe angle of the wheel 1 accordingly.

FIGS. 2 and 3 show one embodiment of the multipart wheel carrier 10 shown in FIG. 1. This embodiment, in terms of fundamental structure, agrees with the wheel carrier 10 of FIG. 1. In this respect, reference is made to its description.

FIG. 2 shows, in a longitudinal section along the axis 22 of rotation of the wheel 1 of the wheel suspension, the wheel carrier 10 in a structural version.

The wheel carrier 10 as described above is composed of the guide part 14 which is articulated to the wheel guide elements such as connecting rods, etc., the carrier part 12 which carries the wheel and the rotationally symmetrical positioning cylinders 16, 18.

The guide part 14 has a carrying flange 34 which bears a radially inside bearing ring 36. The bearing ring 36 forms a first slide bearing arrangement whose axis of rotation coincides with the axis 22 of rotation by way of a slide surface 38 with the radially outside positioning cylinder 18.

As shown in FIG. 2, the servomotors 26, 28 are dynamically connected to the positioning cylinders 16, 18, as suggested by the arrows. The positioning cylinder 18 in one version can be provided on its outer periphery with a ring gear which is not shown and which propulsively interacts with a driving gear of the electrical servomotor 28, which gear is not shown. The servomotor 28 can likewise be attached to the carrying flange 34 of the guide part 14.

The guide part 12 as shown in FIG. 2 has a radially aligned flange section 40 and an axially running hub section 42. The hub section 42 extends radially within the two positioning cylinders 16, 18 to the height of the bearing ring 36 of the carrying flange 34.

Within the flange section 40 there is a wheel bearing 44 as a pivot bearing for a wheel flange, which is not detailed, with an axially into the hub section 42 likewise in the direction of the shoulder of the articulated shaft bell-shaped housing 62.

The wheel 1 is conventionally attached to the wheel flange by means of wheel bolts. In addition, the brake disk of a disk brake is attached to the wheel flange. The caliper of the disk brake is attached to the flange section 40 of the carrier part 12 in a manner which is not apparent.

Furthermore, on the hub section 42, the positioning cylinder 16 is pivoted by way of a slide surface 56. Both positioning cylinders 16, 18 are therefore pivoted around their axes 24 of rotation between the carrier part 12 and the guide part 14. The axis 22 of rotation of the guide part-side positioning cylinder 18 is aligned coaxially to the axis 20 of rotation of the wheel in the illustrated neutral position. The axis of rotation 24 of the carrier part-side positioning cylinder 16 is inclined upward by an angle x relative to the axis 22 of rotation of the guide part-side positioning cylinder 18.

The relevant oblique surfaces 16b, 18b of the positioning cylinders 16, 18 are made differently by angle and obliquely to the axis 22 of rotation of the guide part-side positioning cylinder 18 such that by rotating them the camber angle and/or toe angle of the wheel can be adjusted in the region of about 5° out of the neutral position shown in FIGS. 2 and 3.

The positioning cylinder 16 bears an outer ring gear which is not shown and which is drivingly connected to the electrical servomotor 26 by way of a driving gear which is not apparent. The servomotor 26 is attached accordingly to the flange section 40 of the carrier part 12.

The vehicle wheel 1 is driven by way of an articulated shaft 60 which is only partially shown, and of which in FIG. 2, for the sake of simplicity, only its articulated bell-shaped housing 62 and the sleeve-shaped driving journal 64 are shown. The driving journal 64 is inserted by way of a spline into the hub section 48 of the wheel flange and is tensioned against the wheel flange by means of a clamp bolt, which is not shown, with a tensioning sleeve.

The anti-rotation device between the guide part 14 and the carrier part 12 radially outside the positioning cylinders 16, 18 is a cardan joint 57 which is connected between the wheel-side carrier part 12 and the axle-side guide part 14.

The cardan joint 57 as shown in FIG. 3 as a central articulated part has a cardan ring 63 which extends radially outside around the positioning cylinders 16, 18 and is spaced by a radial distance from the positioning cylinders 16, 18. The cardan ring 63 is connected to the wheel-side carrier part 12 and the axle-side guide part 14 by way of a cardan joint fork 77.

The two articulated forks 77 each have wheel-side and axle-side crosspieces 65, 66. The crosspieces 65, 66 are both permanently connected to the carrier and the guide parts 12, 14 and are also coupled to the cardan ring 63 by means of bearing journals 68 which define the axes 67, 69 of rotation which are at a right angle to one another. The wheel side and axle-side crosspieces 65, 66 as shown in FIG. 3 are angularly offset to one another by an angle of 90°. So that the cardan joint 57 can follow the angle deflections of the wheel carrier 10, the bearing journals 68 are arranged such that their axes 67, 69 of rotation cross the intersection point B between the axis 22 of rotation of the positioning cylinder 18 and the axis 24 of rotation of the positioning cylinder 16.

The device for adjusting the wheel camber and/or toe as described above is radially sealed outside against ambient effects such as moisture and dirt by means of a rubber-elastic bellows 74 (compare FIG. 2).

Alternatively, the bellows 74 can be made as a thin-walled metal bellows which, when sufficiently torsionally stiff, is used as an anti-rotation device and, in addition, is flexurally elastic to the extent that it permanently accommodates the indicated adjusting angles with sealing of the radially internal functional parts. The above described cardan joint 57 can then be omitted.

The radially inner sealing of the positioning cylinders 16, 18 and their slide surfaces or contact surfaces 16b, 18b, 38, 56 is located between the bearing ring 36 on the carrying plate 34 of the guide part 14 and the hub section 42 of the carrier part 12 in the region of the articulated bell-shaped housing 62 of the articulated shaft 60. It must be considered here that when the camber and toe of the wheel are adjusted, the carrier part 12 executes a wobbling motion with an articulated pole roughly at M so that on the annular gap a between the articulated bell-shaped housing 62 and the bearing ring 36 there should be sufficient floating.

To ensure reliable sealing, on the hub section 42 a sleeve-shaped gasket 76 is supported to be axially displaceable and has on its end face a spherical section 76a which interacts with a dome-shaped recess 36a in the bearing ring 36. A helical compression spring 78 which is supported on the ring collar of the hub section 42 and of the gasket 76 pretensions the spherical section 76a of the gasket 76 against the recess 36a.

The radii of curvature of the slide surfaces 76a, 36a are at least more or less made such that their midpoint coincides with the movement pole B in the axis 22 of rotation. The slide surfaces 76a, 36a are provided with a surface finish or are coated with a material (for example PTFE) which has low friction.

The invention claimed is:

1. Device for adjusting the camber and/or toe of a driven wheel of a wheel suspension, in particular for motor vehicles, with a wheel carrier on which the wheel is pivoted, the wheel carrier being divided into a carrier part which holds the wheel, a guide part which is connected to the wheel suspension and into two pivotal parts which are arranged in between, which pivotal parts are rotatable relative to one another as well as to the carrier part and to the guide part around axes of rotation, and which pivotal parts interact with control surfaces which face one another and which are tilted by a defined angle to the axis of rotation, and a wheel drive shaft which is guided by the carrier part and guide part and by the pivotal parts, wherein the carrier part has a hub section which surrounds the wheel drive shaft and which hub extension extends to the guide part and around which the two pivotal parts are situated and that between the hub section and the guide part an inner sealing element is connected which seals an annular gap between the hub section and the guide part.

2. The device according to claim 1 wherein radially outside the pivoted parts between the carrier part and the guide part there is an outer sealing element so that between the inner and outer sealing element an annulus sealed to the outside for the pivoted parts is formed.

3. The device according to claim 2 wherein the radially outer sealing element is formed by a bellows which is permanently connected to the carrier part and to the guide part.

4. The device according to claim 3 wherein the bellows is made as metal bellows and functions as an anti-rotation device for the carrier part to the guide part.

5. The device according to claim 2 wherein in the annulus there is a cardan joint which is coupled to the carrier part and the guide part in the peripheral direction.

6. The device according to one claim 1 wherein on the guide part a bearing ring is formed on which one pivoted part is pivoted and/or that the radially inner sealing element is located between the bearing ring and the hub section of the carrier part.

7. The device according to one claim 1 wherein the sealing element is formed by a gasket which has a spherical section and which is located on the hub section and interacts with a dome-shaped recess in the guide part, in particular in the bearing ring, to form a seal.

8. The device according to claim 7 whereint the gasket is guided to be axially displaceable on the hub section and is pretensioned by means of a spring against the dome-shaped recess in the bearing ring.

9. The device according to claim 7 wherein the midpoint of the spherical section of the gasket at least more or less coincides with the intersection point of the axis of rotation of the carrier part-side positioning cylinder and the axis of rotation of the guide part-side positioning cylinder when the camber and the toe angle are adjusted by way of the pivoted parts.

10. The device according to claim 1 wherein the pivoted parts can be rotated by way of servomotors which are attached in particular to the carrier part and to the guide part, and which preferably interact by way of spur gearing with ring gears made preferably on the positioning cylinder, the tooth engagements each lying within the radially outer sealing, which servomotors are located in particular in the annulus.

11. In an assembly of a wheel suspension for adjusting the camber and/or toe of a driven wheel of a motor vehicle, including an outer carrier disposed coaxially with a drive shaft connected to a wheel and connected to said wheel, an inner carrier disposed coaxially with a drive shaft connected to a wheel and connected to said wheel, an inner carrier disposed coaxially with said axle and supported on said wheel suspension, said carriers having mating surfaces lying in a plane disposed at an acute angle to said axle axis and means for rotating at least one of said carriers relative to the other of said carriers about said axel axis to alter the rotational axis of said wheel, a seal disposed coaxially relative to said axle axis, mounted on one of said carriers and engaging with-the other of said carriers in sealing relation.

12. In an assembly according to claim 11 including a second seal disposed between said carriers, radially spaced from said first mentioned seal.

13. In an assembly according to claim 11 including means universally interconnecting said carriers.

14. In an assembly according to claim 11 including means disposed on one of said carriers for biasing said seal against the other of said carriers.

15. In an assembly according to claim 11 wherein one of said carriers includes a hub section disposed coaxially with said axle axis and said seal is disposed on said hub section.

16. In an assembly according to claim 15 wherein said seal has a partially spherical surface engaging a complementary surface of said other carrier.

17. In an assembly according to claim 15 including a second seal disposed between said carriers, radially spaced from said first mentioned seal.

18. In an assembly according to claim 15 including means universally interconnecting said carriers.

19. In an assembly according to claim 15 including means disposed on said hub section for biasing said seal against the other of said carriers.

20. An assembly according to claim 12 wherein said second seal comprises a bellows.

* * * * *